(12) United States Patent
Mandanapu

(10) Patent No.: US 9,749,476 B2
(45) Date of Patent: Aug. 29, 2017

(54) SYSTEM AND METHOD FOR PROVIDING TOLL-FREE APPLICATION DATA ACCESS

(71) Applicant: Orange, Paris (FR)

(72) Inventor: Subash Mandanapu, San Bruno, CA (US)

(73) Assignee: ORANGE, Paris (FR)

( * ) Notice: Subject to any disclaimer, the term of this patent is extended or adjusted under 35 U.S.C. 154(b) by 51 days.

(21) Appl. No.: 14/901,350

(22) PCT Filed: Jun. 25, 2014

(86) PCT No.: PCT/IB2014/001442
§ 371 (c)(1),
(2) Date: Dec. 28, 2015

(87) PCT Pub. No.: WO2014/207550
PCT Pub. Date: Dec. 31, 2014

(65) Prior Publication Data
US 2016/0150094 A1    May 26, 2016

Related U.S. Application Data

(60) Provisional application No. 61/840,082, filed on Jun. 27, 2013.

(51) Int. Cl.
*H04L 29/08* (2006.01)
*H04L 12/14* (2006.01)
(Continued)

(52) U.S. Cl.
CPC ........ *H04M 15/59* (2013.01); *H04L 12/1475* (2013.01); *H04L 67/141* (2013.01);
(Continued)

(58) Field of Classification Search
CPC .............. H04L 12/1475; H04L 67/141; H04L 12/1435; H04L 12/1492; H04L 41/5025; H04M 15/59; H04W 12/08
See application file for complete search history.

(56) References Cited

U.S. PATENT DOCUMENTS 8,472,919 B1     6/2013  Sivalingham
2003/0051041 A1*  3/2003  Kalavade ............... G06Q 20/14
                                                  709/229
(Continued)

FOREIGN PATENT DOCUMENTS

WO    2012172430 A2    12/2012

OTHER PUBLICATIONS

International Search Report and Written Opinion dated Dec. 5, 2014 for corresponding International Application No. PCT/IB2014/001442, filed Jun. 25, 2014.

*Primary Examiner* — Dinh P Nguyen
(74) *Attorney, Agent, or Firm* — David D. Brush; Westman, Champlin & Koehler, P.A.

(57) ABSTRACT

Toll-free application data network access is disclosed. In one aspect, there is a device for providing data connectivity. The device includes a connection detector configured to receive a data connectivity request from an application installed on the device. The device further includes an authorization transceiver. The authorization transceiver is configured to transmit an authorization request to a service provider associated with the application via a telecommunication connection, the authorization request including an application identifier for the application and an operator identifier for the service provider. The authorization transceiver is further configured to receive an authorization response indicative of operator specific billing for the application from the service provider. The device also includes a con- (Continued)

nection manager configured to establish data connectivity via the telecommunication connection based on the authorization response.

26 Claims, 10 Drawing Sheets

(51) Int. Cl.
*H04L 12/24* (2006.01)
*H04M 15/00* (2006.01)
*H04W 12/08* (2009.01)

(52) U.S. Cl.
CPC ......... *H04W 12/08* (2013.01); *H04L 12/1435* (2013.01); *H04L 12/1492* (2013.01); *H04L 41/5025* (2013.01)

(56) References Cited

U.S. PATENT DOCUMENTS

| | | | |
|---|---|---|---|
| 2007/0226354 A1* | 9/2007 | Bang | G06Q 30/04 709/227 |
| 2011/0069661 A1* | 3/2011 | Waytena, Jr. | H04L 63/102 370/328 |
| 2012/0254042 A1 | 10/2012 | Ludemann | |
| 2012/0276867 A1* | 11/2012 | McNamee | H04L 12/1407 455/406 |

* cited by examiner

SYSTEM AND METHOD FOR PROVIDING TOLL-FREE APPLICATION DATA ACCESS

BACKGROUND

Field

The present application relates generally to acquiring access to a data network and more specifically to systems, methods, and devices for toll-free application data network access.

Description of Related Technology

In many telecommunication systems, the operators of a network control who can access the network as well as the degree of access permitted. The access may be controlled by a subscription. The subscription is generally an agreement between a user and a network operator. The agreement typically includes payment for access.

As devices become more robust, the content available for display via the devices also increases. The devices may process more data in a faster way to provide enhanced user experiences. For example, some smartphones are capable of downloading high-definition video content via a cellular/LTE/3G connection for display on the smartphone.

While the devices may be consuming more data, the users must account for the increased data obtained via the network. To help curb the overall network impact, some network operators have introduced limited data plans. These limited plans allow a fixed quantity of data access for a device. Should a particular device consume more than the plan amount, the user of such a device is either cutoff from further access or permitted additional access at an extra, perhaps, cost.

Furthermore, some devices are available without a data plan. Such devices may be configured to execute applications such as a video or music player. These devices may attach to a data network using a Wi-Fi network, but, due to the lack of a contract, are unable to access the data network via cellular/LTE/3G connections.

Accordingly, devices, systems, and methods for permitting toll-free application data network access on an application-by-application basis are desirable.

SUMMARY OF CERTAIN INNOVATIVE ASPECTS

In one innovative aspect, there is a device for providing data connectivity. The device includes a connection detector configured to receive a data connectivity request from an application installed on the device. The device further includes an authorization transceiver. The authorization transceiver is configured to transmit an authorization request to a service provider associated with the application via a telecommunication connection, the authorization request including an application identifier for the application and an operator identifier for the service provider. The authorization transceiver is further configured to receive an authorization response indicative of operator specific billing for the application from the service provider. The device also includes a connection manager configured to establish data connectivity via the telecommunication connection based on the authorization response.

In another innovative aspect, there is a method of providing data connectivity. The method includes receiving a data connectivity request from an application installed on a device. The method further includes transmitting an authorization request to a service provider associated with the application via a telecommunication connection, the authorization request including an application identifier for the application and an operator identifier for the service provider. The method also includes receiving an authorization response indicative of operator specific billing for the application from the service provider. The method also includes establishing data connectivity via the telecommunication connection based on the authorization response.

In a further innovative aspect, there is a computer-readable storage medium comprising instructions executable by a processor of an apparatus. The instructions cause the apparatus to perform the method of providing data connectivity described above.

In one or more of the above aspects, the data connectivity request may include a packet data network destination address. The authorization request may further include one or more of a location identifier indicating a geospatial location of the device, a device identifier uniquely identifying the device, and a user identifier indicative of a user of the application causing the data connectivity request. In the aspects described above, the telecommunication network may be operated by the service provider or by a partner service provider.

With respect to the authorization response, the response may include at least one of an authorization token and data connectivity policy information. The authorization token may be included in data transmitted via the telecommunication connection. The data connectivity policy information includes at least one of a data transmission amount, a received data amount, a data connection duration, and a policy expiration time.

The systems, methods, or devices described above may also collect information for an authorized data connection. The information collected for the authorized data connection includes a data transmission amount, a received data amount, a data connection duration, a destination of data transmitted, a source of data received, one or more data request messages, one or more data response messages, and a time at which the authorized data connection was established. The authorized data connection may be maintained based on a comparison of the information collected and the authorization response message. Maintaining the authorized data connection comprises terminating the authorized data connection when the collected information indicates the authorized data connection has exceeded an authorized limit included in the authorization response message. At least a portion of the collected information may be transmitted to the service provider. The transmission may be based on at least one of power or network bandwidth available to the device. The portion of the collected information may be stored when the at least one of power or network bandwidth available is below a threshold value.

The systems, methods, or devices described above may also transmit a status message for the authorized data connection to at least one of the application or the device, the transmitting based on a comparison of the information collected and the authorization response message. The status message may include an amount of data connectivity remaining for the application.

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include toll-free cross carrier data network access.

DETAILED DESCRIPTION OF CERTAIN ILLUSTRATIVE EMBODIMENTS

Figure 1:
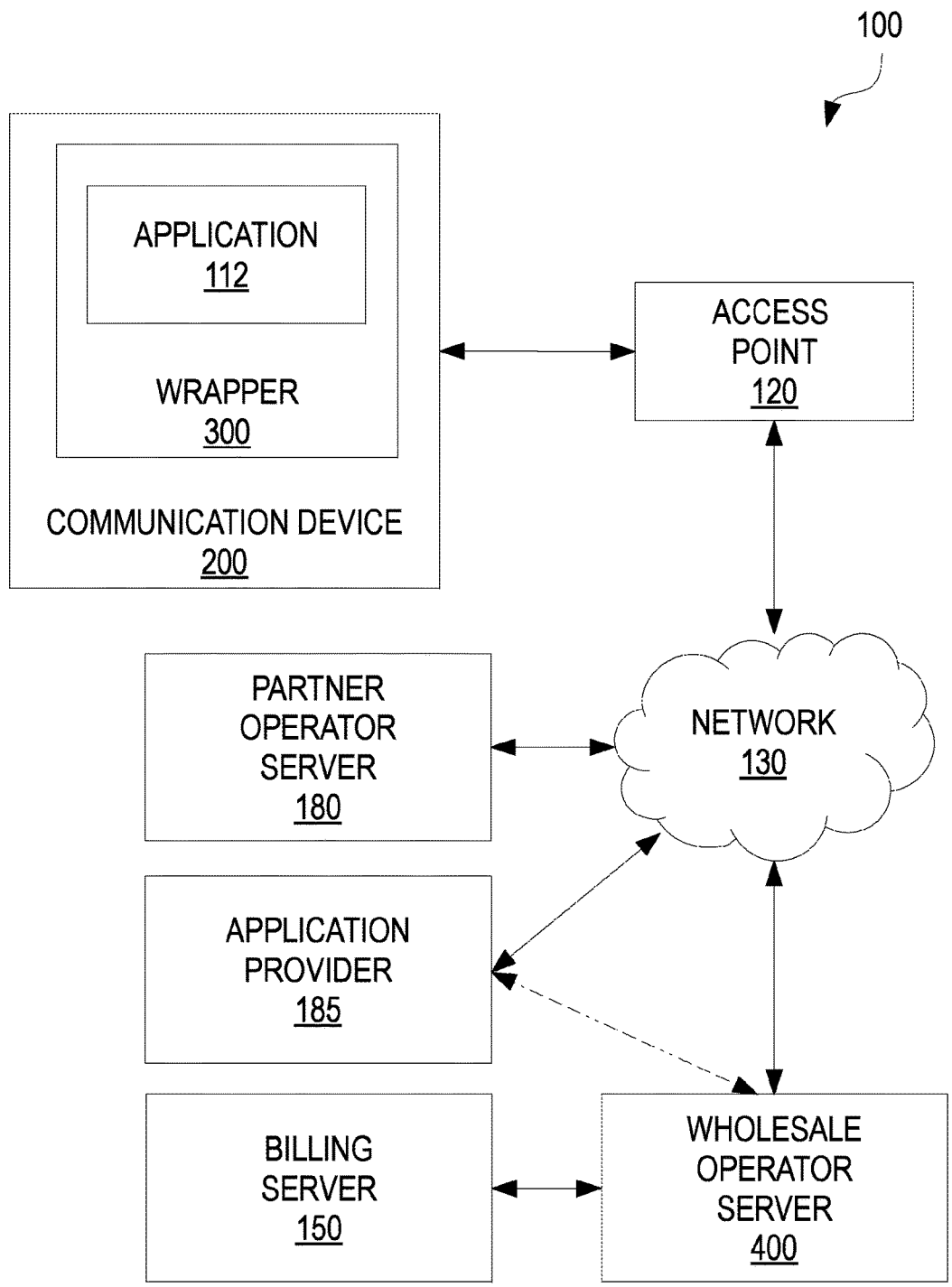
FIG. 1 is a functional block diagram of an example communication network system.

In one aspect, an architecture comprising a first application operable to request data connection to a telecommunication network in a client/server mode is provided. The architecture also includes a wrapper for the first application and operable to detect triggering of the first application (or intercept first request for data from server), send an authorization request to a billing server in the telecommunication network, the authorization comprising an application identifier and an operator identifier for requesting special handling of the first application data connection from the operator, and, upon receipt of an authorization from the billing server, authorizing data connection to the network from the first application.

Some network operators may find a benefit in partnering with companies to offer toll-free (e.g., no charge) or discounted connectivity for applications. For example, the companies may offer prepaid applications that would allow a user to access and use an application for a certain amount of time or data, even in a roaming situation.

The experience to the user may be transparent. The systems and methods described herein provide the management of the toll-free connectivity without the need for user interaction. This is achieved in-part via an application wrapper that is associated with a regular application. The wrapper is generally arranged to detect triggering of the application. Once triggered, the wrapper may send a request to the network to identify a specific billing plan for the application. The wrapper may receive authorization from the network and execute the application normally under the specific billing plan for the application. The wrapper may report monitored data usage for the application to the network. Through the use of wrapper, the billing of the application may not be charged to the user or charged at a discounted rate.

As one example, consider a content provider like "MegaSports." MegaSports may develop an application which may execute on mobile devices but requires access to a data network to obtain the content. MegaSports may negotiate a global wholesale data access deal with network provider like SuperTelco. The deal may specify various data access limits for traffic associated with the wrapped application. Examples of these limits may include one or more of a maximum data limit, per data unit (e.g., byte, megabyte, gigabyte) price, and geographic coverage, service level agreements (SLAs) on mobile, fixed, per user limits, etc. SuperTelco may provide an API/wrapper to MegaSports' application. MegaSports can distribute the application through multiple distribution channels including application stores, SIM cards, hardware attachment (e.g., earphones, sensor, etc.), and the like. When a customer of SuperTelco tries to use the MegaSports application, SuperTelco may identify the application traffic as related to MegaSports and manage the session until the negotiated quota expires. This may include refraining from billing the user for application traffic for the MegaSports application.

When some user is accessing a partner network, such as OtherTelco, the application data connectivity requests may be routed to SuperTelco to validate access (e.g., via APIs). Once validated SuperTelco can provide OtherTelco with SLAs and per user quota limits OtherTelco may manage the end user session including allowing traffic to and from the MegaSports application based on the provided information. Upon completion of a user session or another designated time, OtherTelco may send a clearance request to SuperTelco. The clearance request may include the amount owed to OtherTelco for allowing the application traffic for the MegaSports application. SuperTelco may then settle the charges to OtherTelco.

One non-limiting advantage of the described aspects is the ability to provide a data rich application in way that does not require the user to pay for accessing. The bargain of receiving the user's usage data in exchange for free data access subsidized by the application provider may be an attractive bargain.

A further non-limiting advantage of the described aspects is the transparency to the user and the application provider. In part because the application wrapper forms a contain within which the application can execute, the functions of the application may be monitored and enhanced to provide the toll-free experience without the need for further user or application provider configurations.

Another non-limiting advantage of the described aspects is the application can access a network controlled by a wholesale network operator who has negotiated the wrapped application with the application provider. The application may also access a network controlled by a partner network operator (e.g., roaming). In such implementations, the partner may allow the application toll-free access and instead of charging the user, the partner can reconcile the cost of the access with the wholesale operator. Furthermore, devices without a traditional cellular data plan may use aspects described to use a data rich application.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different data access technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a functional block diagram of an example communication network system. The system 100 includes a communication device 200. The communication device 200 may be an electronic communication device such as a mobile phone, a smart phone, a tablet computer, a personal computer, a game console, a set-top box, or other communication device configured to transmit/receive data.

The communication device 200 may include an application 112. An application may generally refer to an installed capability for the communication device 200. Example applications include a web browser, a movie viewer, a music player, a newsreader, a document editor, or other functional additions to the communication device 200. The application 112 may be installed on the communication device 200 by the manufacturer, a network operator providing service for the device, and/or a user of the communication device 200. The application 112 may be installed once hardware is attached to the communication device 200. For example, attaching a sensor to the communication device 200 may cause the execution/installation of the application 112. The installation may be performed at the time of manufacture, via over the air provisioning, via storage coupled to the communication device 200 such as a SIM card, or other suitable installation means.

The application 112 may be wrapped by a wrapper 300. The wrapper 300 may be considered a container for the application 112. The application 112 may be executable without a wrapper, but the wrapper 300 may provide additional functionality for the application 112 without requiring the application developer to know the details of the wrapper 300 interface. For example, an application developer may generate a new interactive game. Standing alone, the application may request network access for playing the game. In a wrapped mode, the application may request network access via the wrapper 300 for playing the game. The wrapper 300 may intercept the network access request and perform additional processing related thereto as will be described in further detail below.

The communication device 200 may be configured to access a network 130 via an access point 120. The access point 120 may be a Wi-Fi access point, a cellular access point, an LTE or other 3G access point, a radio access point, a wired access point (e.g., Ethernet), or other network portal. Accordingly, the network 130 may be a packet switched network, a public network, a wide-area network, a private area network, a mesh network, a cellular network, a radio network, a local area network, or other such communication network configured to transmit and receive data between devices.

The access point 120 may be configured to permit certain communication devices access to the network 130. The access point 120 may perform authorization for the communication device before allowing access to the network 130. The communication device 200 may provide information to the access point 120 which may be used to determine whether or not to allow the communication device 200 to access the network 130. The access point 120 is generally associated with a service provider. The service provider is the entity which determines who may access the network 130. For example, a telecommunications company may construct a radio tower access point to allow customers with a valid subscription to access a network. In such cases, the telecommunications company may wish to limit or otherwise control who can access the network.

FIG. 1 shows a wholesale operator server 400 in data communication with the network 130. The wholesale operator server 400 is configured to provide access on a wholesale basis. The wholesale operator server 400 may receive information regarding communication devices and/or applications which are allocated an amount of network access. Accordingly, when an application requests access via the access point 120, the access point 120 may inquire with the wholesale operator server 400 as to whether the application and/or communication device is authorized for wholesale access. In the event the application and or communication device is not authorized, the access point 120 may fall back on a standard subscription determination for the communication device 200. For example, a determination as to whether the communication device 200 has a valid subscription may be performed.

The wholesale operator server 400 is in further communication with a billing server 150. The billing server 150 is configured to receive information regarding access for the wholesale operator server 400. Where the access point 120 is operated by an entity other than the wholesale operator, the operator of the network access point may request compensation for allowing the communication device 200 and/or the application 112 to access the network. The billing server 150 may be configured to facilitate this reimbursement by reconciling the usage authorized by the wholesale operator server 400 with the operator of the network access point. In some implementations, the billing server 150 may be configured to generate a billing request to a third-party such as the application developer. The billing request may indicate an amount requested. In some implementations, the billing server 150 may be configured to generate a billing request to an account associated with the communication device 200.

FIG. 1 also includes a partner operator server 180. The partner operator server 180 generally refers to an operator who does not have a negotiated data connectivity policy for the wrapped application. The partner may provide toll-free access to the wrapped application through an agreement (e.g., charge-back agreement) with the wholesale operator. This agreement and subsequent authorization may be achieved through messages transmitted from the partner operator server 180 and the wholesale operator server 400 via the network 130. The authorization messaging will be described in further detail below.

The system 100 shown further includes an application provider 185. The application provider 185 is an entity that provides the application which will be wrapped. The application provider 185 may be coupled with the network 130. The application may be provided via the network 130 such as through an Internet download or an application store. In some implementations, the application provider 185 may provide the application to the wholesale operator server 400 for wrapping and/or distribution. The application provider 185 may also establish the data connectivity policy for the application via the network 130. FIG. 1 shows an optional communication path directly from the application provider 185 to the wholesale operator server 400. Such a direct communication path may be used to provide the application to the wholesale operator for wrapping and/or establish the connectivity policy.

Figure 2:
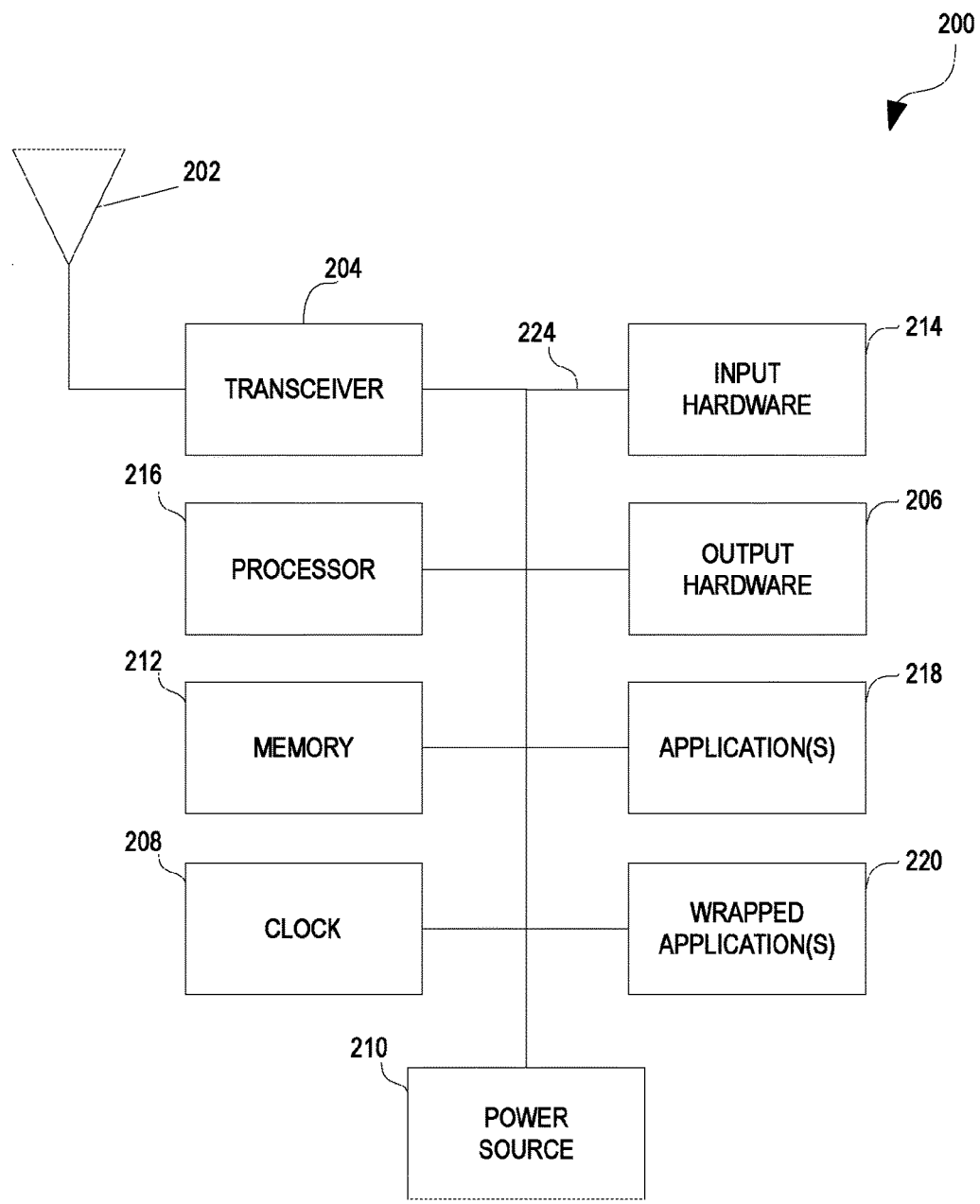
FIG. 2 is a functional block diagram of an example of a communication device.

FIG. 2 is a functional block diagram of an example of a communication device. When implemented as a device hosting a wrapped application, the communication device 200 may include circuitry for performing the main functions of a mobile phone, such as a mobile smart-phone, a tablet computer, a laptop computer, gaming console, set-top-box, personal computer, or the like.

The communication device 200 may include one or more antennas 202 and a transceiver unit 204 for the transmission and reception of wireless signals; output hardware 206 such as an audio unit, a microphone, and/or a display screen; a clock 208; a power source 210 (e.g., battery, solar panel, wired power connection); a memory 212, input hardware 214 such as a keypad or touchscreen for receiving a user input, a GPS unit for indicating the geographical location of the device, a wired network connection (e.g., Ethernet port); and a processor 216. Some output hardware 212 such as a display screen may include a touch sensitive screen. Accordingly, some output hardware 212 may provide input functionality and some input hardware 214 may provide output functionality. The memory 212 may include one or more memory circuits including non-volatile memory circuits (e.g., EEPROM, FLASH, etc.).

Depending on the capabilities of the communication device 200 and the supporting telecommunication networks the communication device 200 can also provide a range of voice and data communication services. As non-limiting examples the communication device 200 provides telephone network based communication services including voice, multimedia and text messaging, as well as other data exchange capabilities, enabling Internet access and email exchange, for example.

The communication device 200 may be configured to exchange data via a 3G network with remote servers such as a wholesale operator server and/or an application provider, and to enable data exchange enabling Internet access (e.g., data network). The communication device 200 is operable to have applications or widgets installed, such as, but not limited to social networking applications or email applications, for example, which when executed may exchange data with the remote servers. Each application or widget installed on the communication device 200 may have an associated graphical user interface.

The communication device 200 may also include one or more applications 218. The communication device 200 may further include one or more wrapped applications 220. A wrapped application 220 is distinguishable from an application in that communications to/from the wrapped application 220 are exchanged via an application wrapper.

Figure 3:
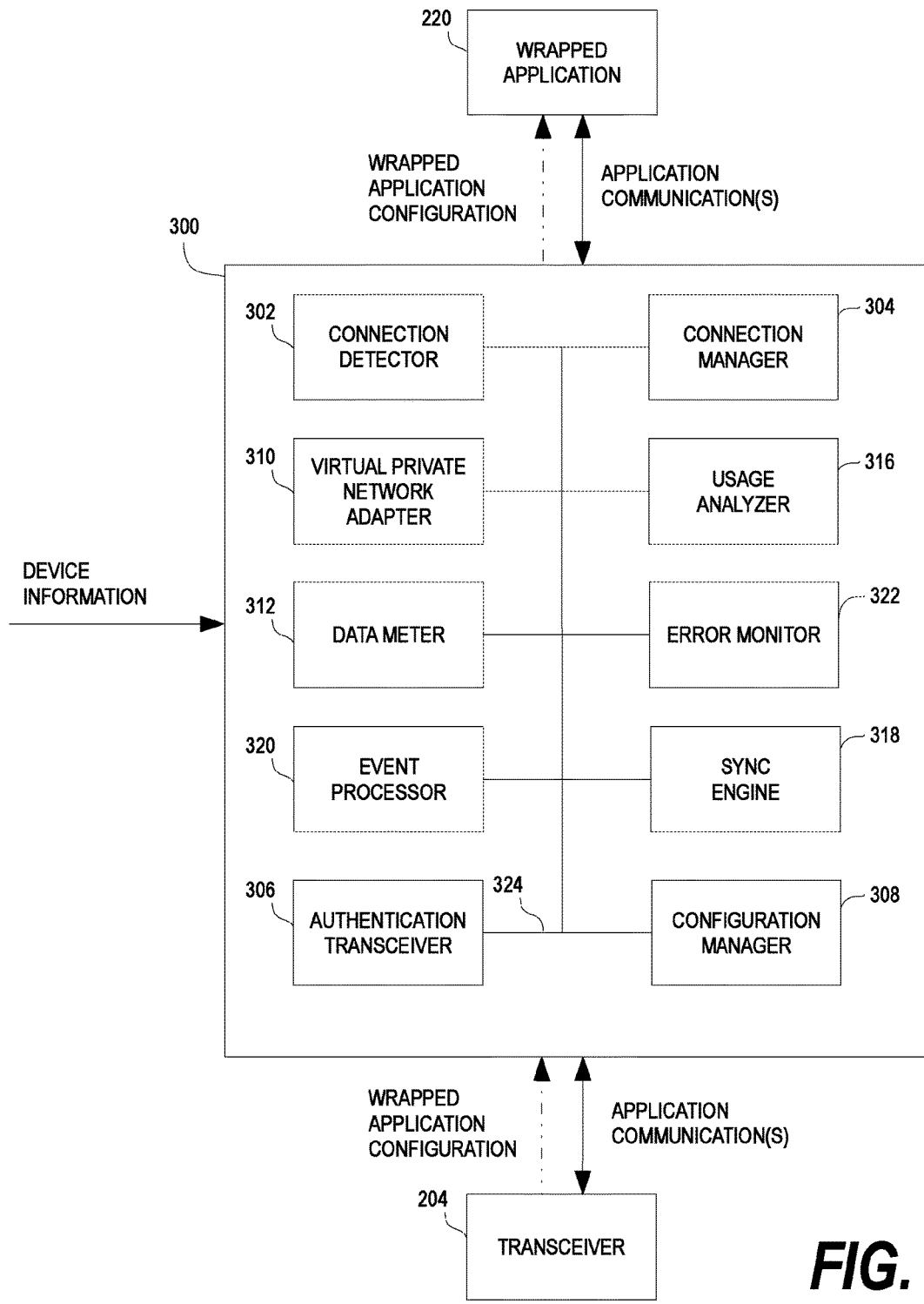
FIG. 3 is a functional block diagram of an example of an application wrapper.

FIG. 3 is a functional block diagram of an example of an application wrapper. The application wrapper 300 includes a connection detector 302. The connection detector is configured to detect connection activity for the wrapped application 220. Connection activity may include a request for a connection, a request to transmit information via a connection, termination of a connection, reset of a connection, or other data communication connection activities.

The connection detector 302 may be configured to detect connection activity based on the application communications received from the wrapped application 220. The connection detector 302 may be configured to generate a message identifying the connection activity and transmit this information via a bus 324.

A connection manager 304 may obtain the message identifying the connection activity. If the message identifies a request for a new connection, the connection manager 304 may cause the initiation of the connection. Once a connection is established, the connection manager 304 may be configured to maintain the connection on behalf of the wrapped application 220.

As part of establishing a connection, the connection manager 304 may be configured to establish a toll-free connection. The connection manager 304 may transmit an authentication request via an authentication transceiver 306. The authentication request may be transmitted to a wholesale operator server. The authentication request includes an identifier for the application and the wholesale operator associated with the application.

The authentication transceiver 306 may receive the authentication response. The authentication response may include an authentication token for a wholesale data connection. The token may be used for subsequent communications to or from the application to indicate the authorization status for the connection. The authentication response may also include a data connectivity policy including one or more of a data transmission amount, a receive data amount, a data connection duration, and a policy expiration time.

The authentication response may indicate a wholesale connection is not available. In such situations, the connection manager may attempt to establish a connection based on subscription information for the device.

A configuration manager 308 may be included in the wrapper 300. The configuration manager 308 may include one or more parameters for the wrapper 300 and/or the wrapped application 220. For example, the configuration manager 308 may receive wrapped application configuration information via the transceiver 204. The wrapped application configuration information may identify a network address for the wholesale operator server, information to be included in the authorization request, information regarding the data connectivity policy, applying copy protections for the application or associated data stored for the application, enabling/disabling device features during application execution (e.g., screen shot, camera, microphone), or other parameter(s) to adjust the function of the wrapper 300 and/or the wrapped application 220.

One non-limiting advantage of the configuration manager 308 is the ability to remotely adjust the wrapper 300 and/or the wrapped application 220. Such control may be useful for providing bug fixes, disabling rogue devices/applications, or dynamically adjusting operational aspects of the wrapped application 220 without requiring a reinstallation or affirmative action on behalf of a user of the device.

The wrapper 300 may also include a virtual private network adapter 310. The virtual private network adapter 310 may be included to provide secure communication between the wrapped application 220 and the network 130. Upon establishing a connection, the virtual private network adapter 310 may be used for application communications. The virtual private network adapter 310 may be used only for authentication. In some implementations, it may be desirable to use the virtual private network adapter 310 for application data communications as well. For example, if the application is a banking application, the application developer may determine that certain transactions utilize the virtual private network adapter 310.

As information flows through the established connection, a data meter 312 is configured to monitor information for the authorized data connection. Information which may be collected includes a data transmission amount, a data received amount, a data connection duration, a destination of data transmitted, a source of data received, one or more data request messages, one or more data response messages, and a time at which the authorized data connection was established. The data meter 312 may also time stamp each element of information to identify when the metered value was collected.

A usage analyzer 316 may be configured to process the information collected by the data meter 312. Such processing may include calculating usage information for an authorized data connection. The usage analyzer 316 may also be configured to compare the usage information with the data connectivity policy. For example if the number of bytes of data for the wrapped application 220 exceeds a quantity specified in the data connectivity policy, the usage analyzer may generate a message indicating the policy amounts have been exceeded. The usage analyzer 316 may be further configured to collect application specific analytics such as the time spent on given location within the application, buttons pressed, application performance, and the like. In some implementations, the application configuration may specify the aspects to analyze.

This message may be received by an event processor 320. The event processor 320 may be configured to instruct the wrapper 300 and/or the wrapped application 220 to take one or more actions based on the received event. Events may include usage events, such as exceeding the authorized data connectivity policy. Events may include device events such as powering down, low battery, incoming phone call, termination of a phone call, initialization of an application, termination of an application, device locking, device unlocking, and the like. An example of an action may be for the connection manager 304 to terminate a connection upon detection of exceeding the authorized data connectivity policy. In some implementations, the event processor 320 may be configured to transmit event information to a third-party. For example, a wrapped application to keep track of where a child's smartphone is located may detect movement into an area of interest (e.g., into a 'restricted' area, at a specific time, etc.). This event may cause the transmission of a text message or email message to another device (e.g., the parent's smartphone) in addition to transmitting application data to the application provider. In the case of an email message, because the wrapped application may provide toll-free access, the application may receive data connectivity to send this potentially life-saving message.

Another example of an action may be to transmit a report of the usage analyzer 316. A sync engine 318 may be configured to provide such an update of usage information for the wrapped application 220. The sync engine 318 may obtain the usage information from the usage analyzer 316, prepare the information for transmission, and send the usage transmission. The sync engine 318 may be configured to transmit such usage information based on an event, and or the periodic schedule. For example, the sync engine 318 may be configured to transmit a report of usage every five minutes. The usage report may include the authorization token, an application identifier, an operator identifier, and a device identifier.

An error monitor 322 is included to detect errors raised by the application and or the wrapper 300. The error monitor 322 may generate an error report. This error report may be transmitted to the wholesale server operator via the sync engine 318. The error report may include the authorization token, an application identifier, and operator identifier, a device identifier, and information related to the error raised.

The wrapper 300 shown in FIG. 3 receives device information. The device information may include one of power or network bandwidth available to the device, a location identifier indicating a geospatial location of the device, a device identifier uniquely identifying the device, and a user identifier. Examples of device information include a device operating system identifier, an operating system version, and device events and/or errors. The device information is made available to the elements of the wrapper 300 for further processing. For example, the sync engine 318 may be configured to defer transmitting usage reports when device resources are limited (e.g., low bandwidth, low power).

The bus 324 may couple the above described elements for the wrapper 300. The bus 324 may be a data bus, communication bus, or other bus mechanism to enable the various components of the wrapper 300 to exchange information. It will further be appreciated that while different elements have been shown, multiple elements may be combined into a single element, such as the data meter 312 and the event processor 320.

Figure 4:
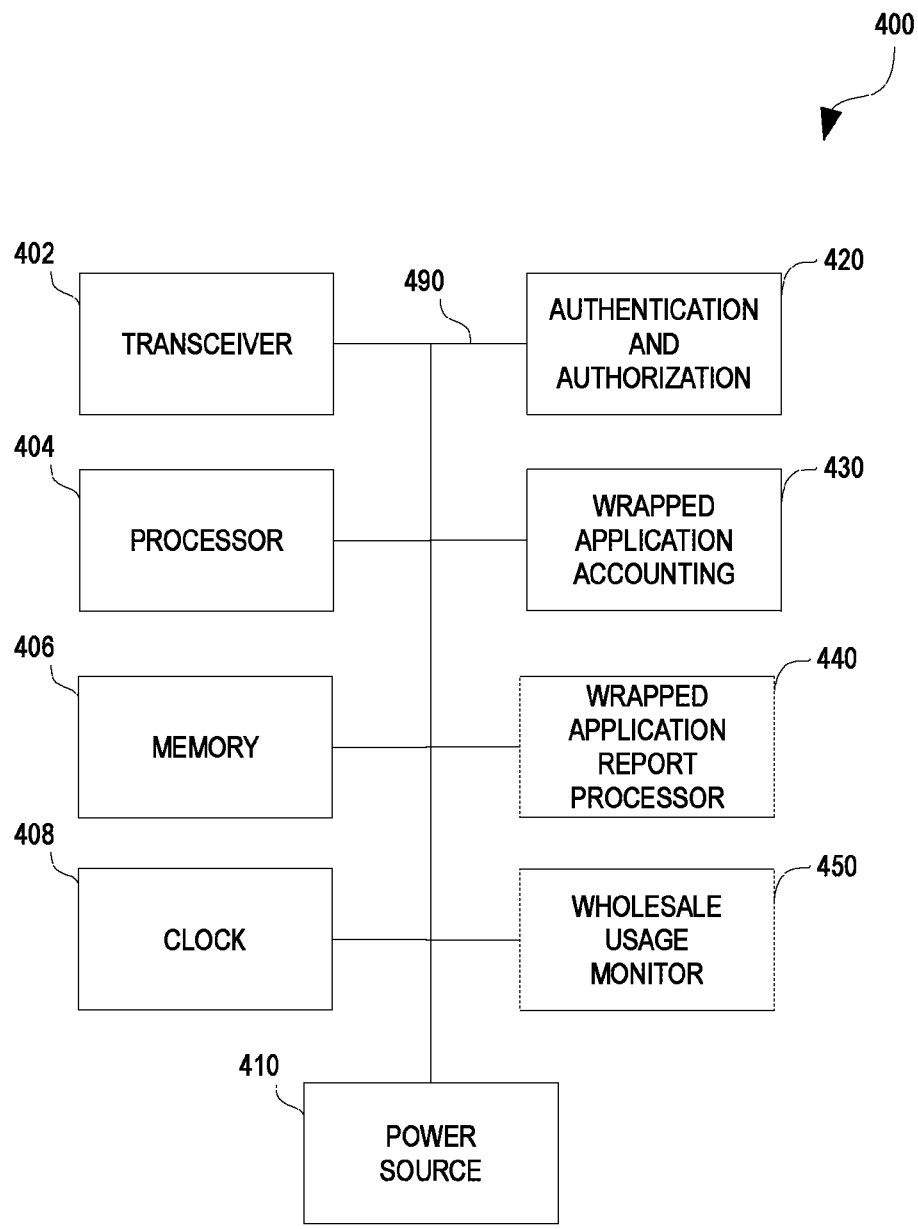
FIG. 4 is a functional block diagram of an example wholesale server.

FIG. 4 is a functional block diagram of an example wholesale server. The wholesale server 400 is configured to manage the provisioning of wholesale data access (e.g., toll-free or subsidized access) for wrapped applications. The management includes receiving applications for wrapped distributions, receiving configuration for the application data policy, providing the authentication and application data policy, and, when the application is made available through partner operator networks, providing an authorization interface and reconciliation interface for the partner operators.

The wholesale server 400 may include one or more antennas (not shown) and a transceiver 402 for the transmission and reception of wireless signals; a processor 404; a memory 406; a clock 408; and a power source 410 (e.g., battery, solar panel, wired power connection). In some implementations, the wholesale server 400 includes a wired network connection (e.g., Ethernet port, fiber optic data port).

The wholesale server 400 includes an authentication and authorization circuit 420. The authentication and authorization circuit 420 is configured to receive wholesale authorization requests and generate an appropriate response. The authentication and authorization circuit 420 may be configured to parse the authorization request to identify the information upon which the authorization determination will be made. The authentication and authorization circuit 420 may then compare the information included in the authorization request with information included in the memory 406. For example, if the authorization request includes an application identifier, the authentication and authorization circuit 420 may look up a data policy associated with the application identifier. This information may then be included in the authorization response.

The authentication and authorization circuit 420 maybe further configured to generate an authentication token to indicate the authorization determination. The authorization token may be generated only when the request is authorized. In some implementations, the token may be generated for all requests (e.g., authorized or unauthorized).

The wholesale server 400 shown in FIG. 4 includes a wrapped application accounting circuit 430. The wrapped application accounting circuit 430 is configured to reconcile usage for the wrapped applications. For example, the application accounting circuit 430 may be configured to periodically (e.g., daily, weekly, hourly, monthly) communicate with the billing server. The application accounting circuit 430 may transmit indicators to exclude the toll-free application data usage from individual subscriber's bills. The application accounting circuit 430 may be further configured to reconcile usage fees associated to the wrapped application incurred via partner operators. In this situation, the application accounting circuit 430 may receive a request for wrapped application data provided via the partner operator and generate a response. The response may include an automatic clearing transaction identifier associated with a funds transfer to the partner operator. The response may include additional status information such as disputed amounts, discrepancy amounts, and the like. The application and accounting circuit 430 may further generate billing information for the application provider. For example, if the application provider has agreed to pay a fixed amount per wrapped application deployed, the application and accounting circuit 430 may collect this information, such as from the memory 406, and generate an appropriate billing request (e.g., via the billing server) for transmission to the application provider.

The wholesale server 400 shown in FIG. 4 includes a wrapped application report processor 440. The wrapped application report processor 440 is configured to generate reports illustrating aspects of the wrapped application. The reports may be summary reports such as total number of users or total quantity of data utilized. The reports may include aggregations such as by date/time, by device type, by user, by device, by location, by network used for data access, by application version number, and the like.

The wrapped application report processor 440 reports may be based on the information collected by a wholesale usage monitor 450. The wholesale usage monitor 450 is configured to receive the usage information from a wrapped application. The wholesale usage monitor 450 may store the received information in the memory 406.

When an application requires data connectivity, several scenarios may arise. In one scenario, the application provider has negotiated data access with a wholesale operator who is also the operator of the network the device executing the application is attached. In this scenario, the network operator has direct access to the wholesale operator server. In a second scenario, the application provider has negotiated data access with the wholesale operator. However the application/device may be attached to a network operated by another network operator. In some implementations, this may be referred to as roaming. In this second scenario, the application may be considered roaming when attempting to access a data network through a connection operated by someone other than the wholesale operator. The message flow diagrams below provide example message flows for establishing a connection and communicating application data in the example scenarios discussed above.

Figure 5:
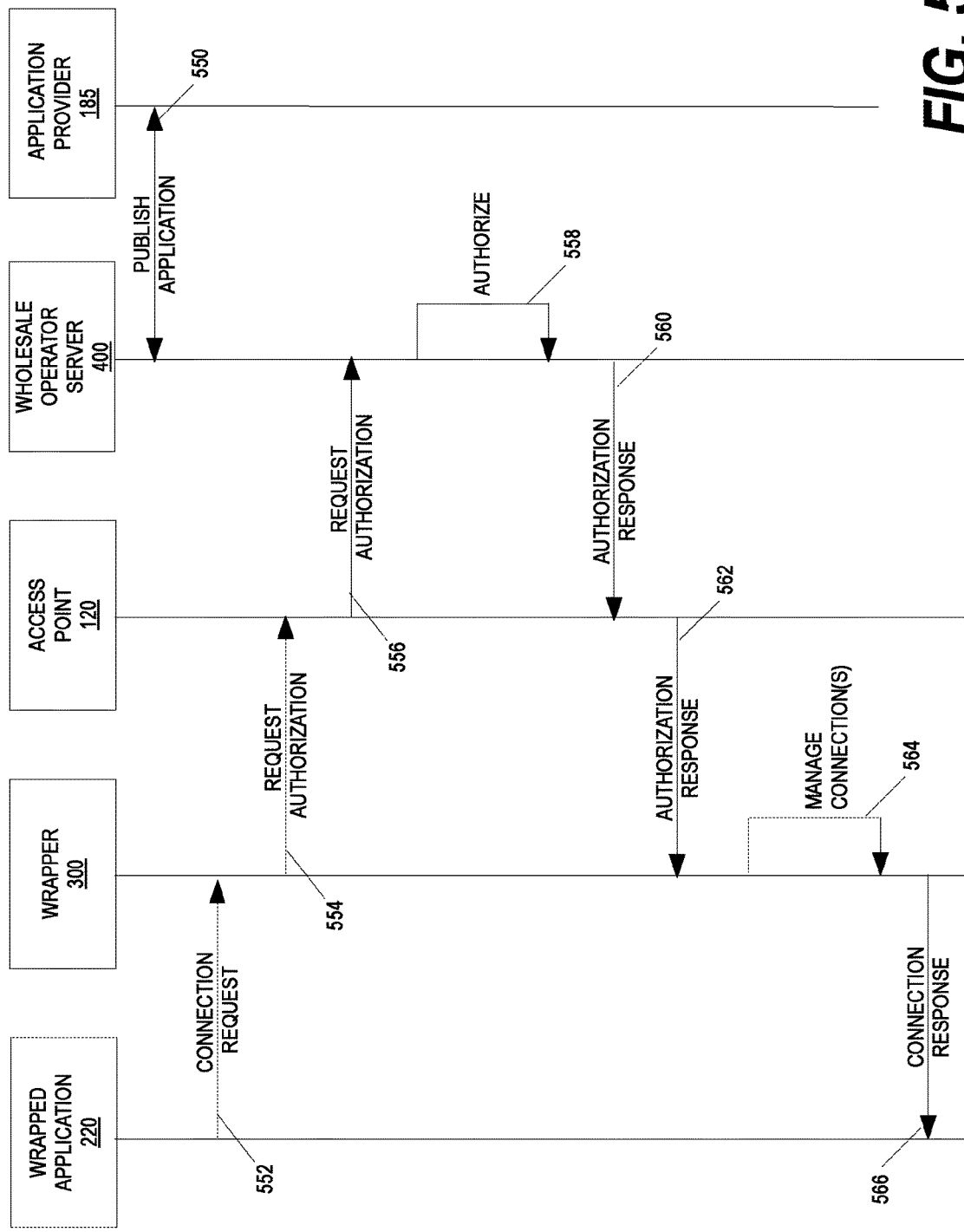
FIG. 5 is a message diagram for obtaining a wholesale data connection.

FIG. 5 is a message diagram for obtaining a wholesale data connection. The message flow of FIG. 5 shows messages exchanged between several entities which may be included in a communication system. For ease of explanation, the number of entities shown has been limited. However, it will be understood that additional entities may be added or multiple entities combined consistent with the description herein. The message flow of FIG. 5 illustrates obtaining a wholesale data connection via a network which is controlled by the wholesale operator.

Messaging 550 between the application provider 185 and the wholesale operator server 400 may be performed to publish the application. In one implementation, the application provider 185 may generate a binary application. The application may then be uploaded to the wholesale operator server 400 such as via HTTP, HTTPS, FTP, or other communication protocol. Upon publishing the application, the wholesale operator server 400 may apply a wrapper to the binary provided by the application provider 185. The publication may be to an application store, a website, or other distribution location/mechanism.

As part of the messaging 550, the application provider 185 may also specify a wholesale agreement with the wholesale operator server 400. For example a news application provider may negotiate 10 MB of use per user per day for an application to be provided by the wholesale operator server 400.

The wrapped application 220 may transmit a connection request to the wrapper 300 via message 552. The wrapper 300 may transmit a message 554 via the access point 120 requesting authorization for wholesale access for the wrapped application 220. The authorization request may include an application identifier and an identifier for the wholesale operator. In some implementations the authorization request may include additional information such as a device identifier, a location identifier, or a user identifier indicative of a user of the application.

The access point 120 may identify the authorization request as a wholesale authorization request. The identification may be based on the application identifier and/or the identifier for the wholesale operator. In some implementations, the authorization request message may be of a distinguishable type. In such implementations, the message type may indicate the destination of the authorization request. The access point 120 may be configured to allow such traffic to pass through to the wholesale operator server 400. In some implementations, the access point 120 may track such requests and include the bandwidth used for further reimbursement from the wholesale operator.

The access point 120 may transmit a message 556 to the wholesale operator server 400 including the authorization request. The wholesale operator server 400 via message 558 may perform an authorization. The authorization may be based on the information included in the authorization request. For example, if the application is executed on a device located within a retail location, wholesale access may be granted free of charge to the device. However if the device travels outside the retail location, limited wholesale access may be granted. The limit may be based on quantity of data, time of day, proximity to the retail location, or other factor.

A message 560 sent from the wholesale operator server 400 to the access point 120 includes the authorization response. The authorization response includes an authorization token. The authorization token may be used to identify the authorization determination for the authorization request, as discussed above. The authorization response may also include a data connectivity policy as discussed above.

The access point 120 may transmit the authorization response via message 562 to the wrapper 300. Based on the authorization response, the wrapper 300 via message 564 may manage the connections. Managing the connections may include establishing the connection, closing the connection, resetting a connection, or the like. In some implementations, the connection manager 304 may be configured to manage the connections. Message 566 is transmitted from the wrapper 300 to the wrapped application 220 indicating the connection response. If authorized, the connection response may include an indication that a wholesale data connection has been established.

Having established a wholesale data connection, the wrapped application 220 may begin using the connection to send and receive data.

Figure 6:
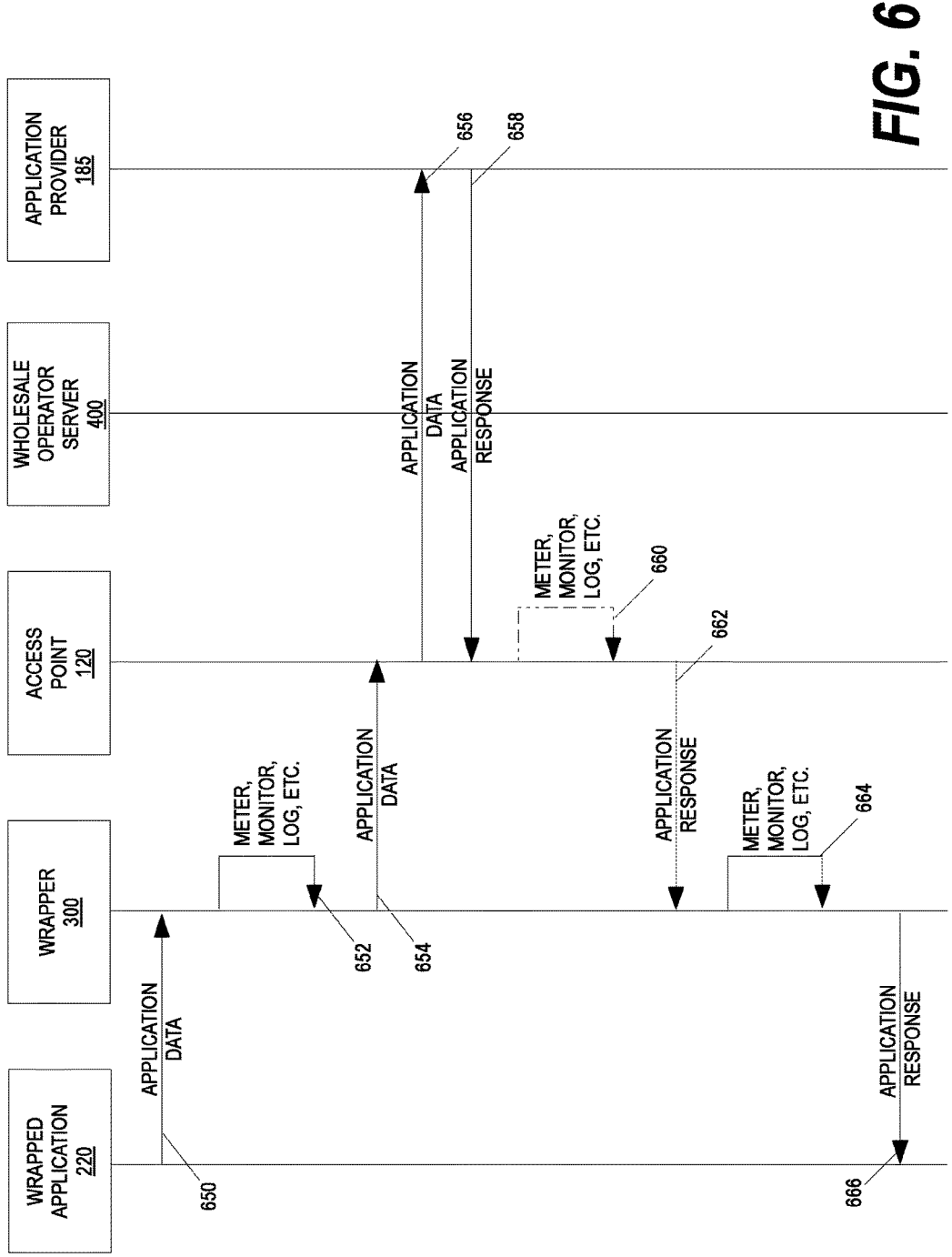
FIG. 6 is a message diagram for communicating data via a wholesale data connection.

FIG. 6 is a message diagram for communicating data via a wholesale data connection. The message flow of FIG. 6 shows messages exchanged between several entities which may be included in a communication system. For ease of explanation, the number of entities shown has been limited. However, it will be understood that additional entities may be added or multiple entities combined consistent with the description herein. The message flow of FIG. 6 illustrates application communication via a wholesale data connection through a network which is controlled by the wholesale operator.

A message 650 may include application data. The message 650 may be transmitted from the wrapped application 220 to the wrapper 300.

The wrapper 300 via message 652 may monitor, meter, log, or otherwise process the application data. Presuming the application data does not violate the data connection policy, message 654 is transmitted from the wrapper 300 to the access point 120 including the application data. The access point 120 may transmit the application data directly to the application provider 185 via message 656. In some implementations, the application data may be transmitted to another service provider (not shown). For example, the application may access content (e.g., multimedia, images, text) hosted by a third-party.

Message 658 includes an application response. The application response shown in FIG. 6 is transmitted from the application provider 185 to the access point 120.

Some access points may be aware that the connection is a wholesale data connection. For example if the access point 120 is maintained by the wholesale operator, the access point 120 may optionally meter, monitor, log, or otherwise process the application response. This is shown in FIG. 6 as optional message 660. Such messaging may be useful to further exercise data connectivity policy control. Consider the situation where an application is allocated 100 MB of data. In an extreme case, where an application response exceeds 100 MB of data, the access point 120 may be configured to terminate the connection. In a less extreme case, it may be determined that an average response for the application is 5 MB. If a response is received for a connection which has already logged 97 MB of usage, the access point 120 may be configured to terminate the connection.

Assuming the access point 120 is not exercising control or otherwise terminating the connection, the application response is transmitted via a message 662 from the access point 120 to the wrapper 300. The wrapper 300 at message 664 will again meter, monitor, log, or otherwise process the application response data. This may include counting the number of bytes received, identifying the content received, logging any errors obtained, and the like.

If the wrapper 300 determines the authorized data policy has not been exceeded, message 666 includes the application response and is transmitted from the wrapper 300 to the wrapped application 220. In the event the data policy has been exceeded, the wrapper 300 may be configured to transmit a message indicating such a state to the application. In this case, the wrapper 300 may also terminate the connection.

Not shown in FIG. 6 is the periodic reporting of the usage data to the wholesale operator server 400. The report may include an identification of the application, data monitored or logged, errors, wrapped application configuration (e.g., settings, version number), or other information related to the wrapped application 220.

Figure 7:
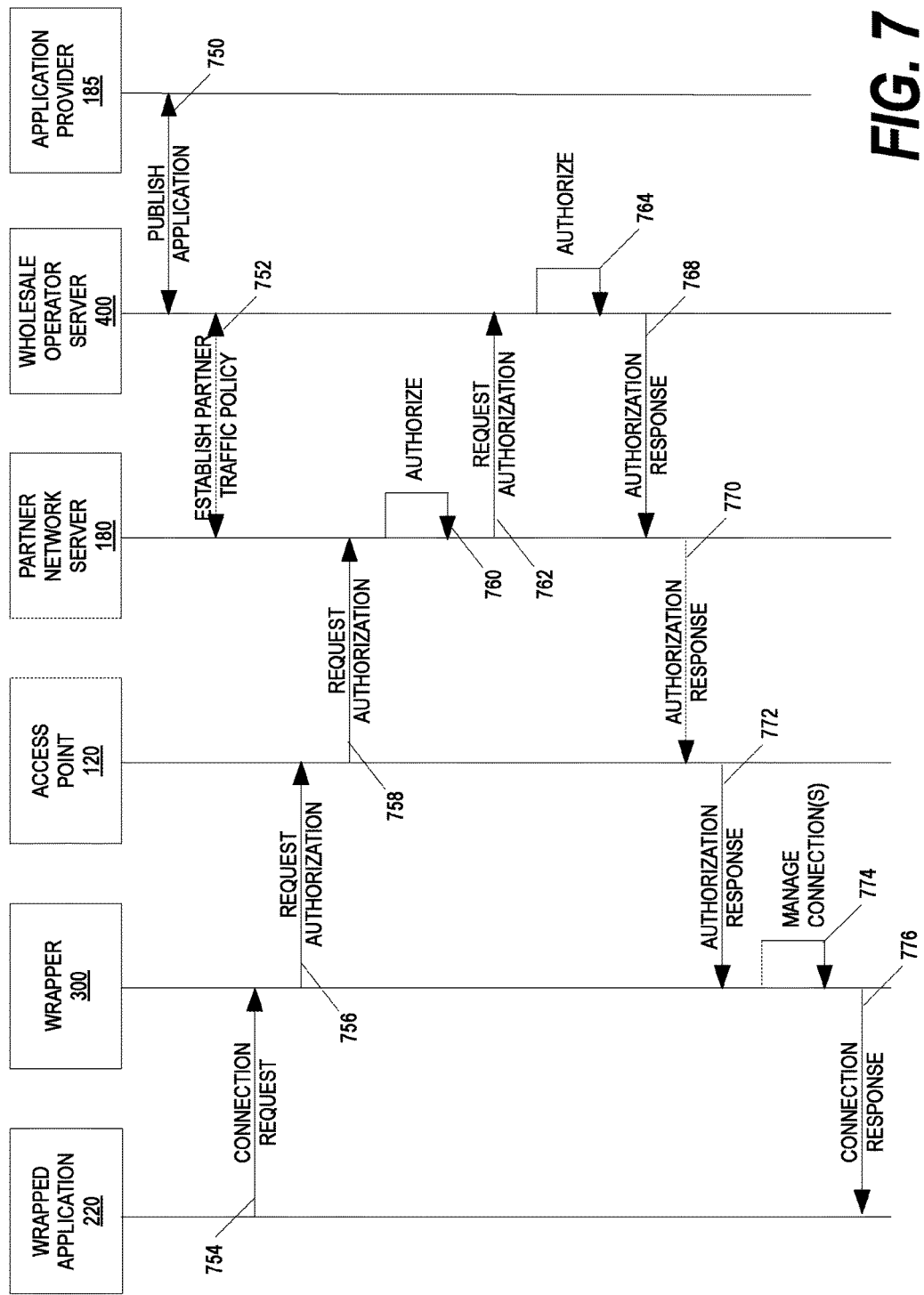
FIG. 7 is a message diagram for obtaining a wholesale data connection from a partner network.

FIG. 7 is a message diagram for obtaining a wholesale data connection from a partner network. The message flow of FIG. 7 shows messages exchanged between several entities which may be included in a communication system. For ease of explanation, the number of entities shown has been limited. However, it will be understood that additional entities may be added or multiple entities combined consistent with the description herein. The message flow of FIG. 7 illustrates obtaining a wholesale data connection via a network which is controlled by a partner operator who is different than the wholesale operator.

Messaging 750 between the application provider 185 and the wholesale operator server 400 may be performed to publish the application. In one implementation, the application provider 185 may generate a binary application. The application may then be uploaded to the wholesale operator server 400 such as via HTTP, HTTPS, FTP, or other communication protocol. Upon publishing the application, the wholesale operator server 400 may apply a wrapper 300 to the binary provided by the application provider 185. The publication may be to an application store, a website, or other distribution location/mechanism.

As part of the messaging 750, the application provider 185 may also specify a wholesale agreement with the wholesale operator server 400. For example a news application provider may negotiate 10 MB of use per user per day for an application to be provided by the wholesale operator server 400.

One or more messages 752 may be exchanged between the wholesale operator server 400 and the partner network server 180 to establish a partner traffic policy. The partner traffic policy provides criteria to the partner network server 180 to indicate that application traffic for a wrapped application should be permitted without additional subscription. For example the partner traffic policy may include a wholesale operator identifier and an application identifier. These two elements may be used to identify wrapped application communications and provide a zero rating for data connections for the identified application and operator through the partner network server 180.

The wrapped application 220 may transmit a connection request to the wrapper 300 via message 754. The wrapper 300 may transmit a message 756 to the access point 120 including an authorization request for wholesale access for the wrapped application 220. The authorization request may include an application identifier and an identifier for the wholesale operator. In some implementations the authorization request may include additional information such as a device identifier, a location identifier, or a user identifier indicative of a user of the application.

The partner network server 180 via message 760 may attempt to authorize the application and/or device. For example, the partner network server 180 may determine a particular device is included on a blacklist based on the information included in the authorization request and therefore will not authorize the device/application to access their network. The authorization may also include authorizing based on previously obtained authorization information from the wholesale operator server 400. In such an implementation, the partner network server 180 may be configured to store data connectivity policy information for specific application and wholesale operator. The partner may use the stored data connectivity policy information to authorize the connection for the application.

In the message flow shown in FIG. 7, the partner network server 180 via message(s) 760 may perform the initial authorization (e.g., determine the request is not black-listed) to determine the request is authorized for limited purpose of communicating with the wholesale operator server 400. As shown however, the partner network server 180 may transmit a message 762 to the wholesale operator server 400 including the authorization request. The authorization request may be the same as transmitted via message 758. In some implementations, the authorization request included in the message 762 may include additional information such as an identifier of the partner network server 180.

The wholesale operator server 400 via message 764 may perform an authorization. The authorization may be based on the information included in the authorization request received from the partner network server 180. For example, if the application is executed on a device is located within a retail location, wholesale access may be granted free of charge to the device/application. However if the device travels outside the retail location, limited wholesale access may be granted. The limit may be based on quantity of data, time of day, or other factor. The authorization may also consider the partner network server 180 through which the request was sent. For example, the wholesale agreement between the wholesale operator and the application provider 185 may be a value based agreement (e.g., $5.00 of service per user per day). In such an implementation, the cost of access may differ between partners. The partner network identifier may be used to identify a cost basis for access which may be included in the authorization determination.

FIG. 7 shows a message 768 sent from the wholesale operator provider to the partner network server 180 including the authorization response. The authorization response includes an authorization token. The authorization token may be used to identify the authorization determination for the authorization request. The authorization determination may be no wholesale access, partial access, or full access. The authorization response may also include a data connectivity policy as discussed above. The authorization response may include data connectivity policy cache information. The data connectivity policy cache information may indicate whether the data connectivity policy information for the specified application may be cached by the partner network server 180 and, if so, how long. This cached information may be used for subsequent authorization such as message 760 discussed above.

A message 770 sent from the partner network server 180 to the access point 120 includes an authorization response. In some implementations, the authorization response included in message 770 may be the same as the authorization response received in message 768 from the wholesale operator server 400. In some implementations, the authorization response is generated based on the authorization response received in message 768 from the wholesale operator server 400. The authorization response of message 770 includes the authorization token. The authorization token may be used to identify the authorization determination for this application/device. The authorization response may also include a data connectivity policy as discussed above.

The access point 120 may transmit the authorization response via message 772 to the wrapper 300. Based on the authorization response, the wrapper 300 via message 774 may manage the connections. Managing the connections may include establishing the connection, closing the connection, resetting a connection, or the like. In some implementations, the connection manager 304 may be configured to manage the connections. Message 776 is transmitted from the wrapper 300 to the wrapped application 220 indicating the connection response. If authorized, the connection response may include an indication that a wholesale data connection has been established.

Having established a wholesale data connection through the partner operator, the wrapped application 220 may begin using the partner operated connection to send and receive data.

Figure 8:
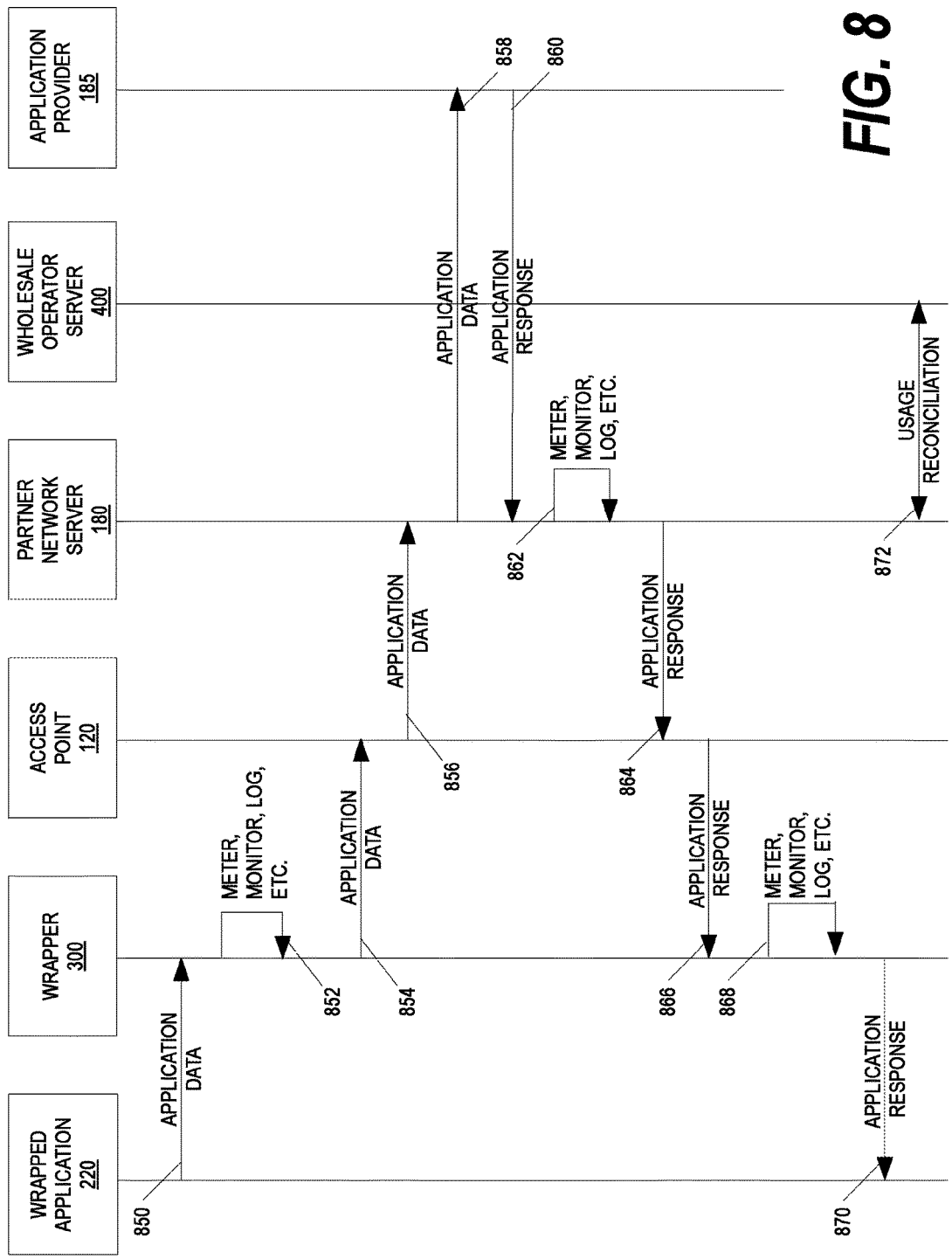
FIG. 8 is a message diagram for transmitting data via a wholesale data connection from a partner network.

FIG. 8 is a message diagram for transmitting data via a wholesale data connection from a partner network. The message flow of FIG. 8 shows messages exchanged between several entities which may be included in a communication system. For ease of explanation, the number of entities shown has been limited. However, it will be understood that additional entities may be added or multiple entities combined consistent with the description herein. The message flow of FIG. 8 illustrates application communication via a wholesale data connection through a network which is not controlled by the wholesale operator (e.g., a partner operator).

A message 850 may include application data. The message 850 may be transmitted from the wrapped application 220 to the wrapper 300.

The wrapper 300 via message 852 may monitor, meter, log, or otherwise process the application data. Presuming the application data does not violate the data connection policy, message 854 is transmitted from the wrapper 300 to the access point 120 including the application data. The access point 120 is configured to transmit the application data to the partner network server 180 via message 856. The application data may include the authorization token to identify the prior connectivity permission granted to the application/device. A validation of the authorization token included in the application data may be performed by the partner operator. If the token is valid (e.g., associated with a previously authorized connection; not expired; etc.), the transmission may be permitted. If the token is not recognized or is expired, the authorization shown in FIG. 7 may be repeated to obtain a new authorization token.

In the case where the application data is authorized, the partner operator transmits the application data to the application provider 185 via message 858. In some implementations, the application data may be transmitted to another service provider (not shown). For example, the application may access content (e.g., multimedia, images, text) hosted by a third-party.

Message 860 includes an application response. The application response shown in FIG. 8 is transmitted from the application provider 185 to the partner operator server 180. The partner operator server 180, at message 862, meters, monitors, logs or otherwise processes the application data and/or response. The partner operator server 180 may seek reimbursement for the data transmitted for the application. Accordingly, the partner operator server 180 may store information related to the application data transmitted and/or received via its network for the application. The information may include a time of transmission, a quantity of data transmitted, a type of data transmitted, the application identifier, a device identifier for the device hosting the application, user information, or other data which can be used to effectively identify the source and/or quantity of data traffic for the application.

Message 864 and message 866 transmit the application response from the partner operator server 180 to the wrapper 300 via the access point 120. The wrapper 300 at message 868 will meter, monitor, log, or otherwise process the application response data. This may include counting the number of bytes received, identifying the content received, logging any errors obtained, and the like. Not shown is the periodic reporting of the usage data to the wholesale operator provider. The report may include an identification of the application, data monitored or logged, errors, wrapped application configuration (e.g., settings, version number), partner operator used for the connection, or other information related to the wrapped application 220.

Assuming the data connectivity policy has not been exceeded, the wrapper 300 may then transmit the application response to the wrapped application 220 via message 870.

Messaging 872 between the partner operator server 180 and the wholesale operator server 400 may be performed to reconcile the usage for the wrapped application 220. As discussed, the partner operator and the wholesale operator may have negotiated terms of access for the application. The terms may include a quantity of data (e.g., per user, per application, for the wholesale operator) or a value of data (e.g., maximum cost). The reconciliation process may include identifying the cost of service provided by the partner operator and generating a request for the amount. The basis for the cost may also be included in the request. The wholesale operator may compare the usage reported by the wrapper 300 with the usage reported by the partner operator. Any discrepancies may be handled through subsequent messaging between the partner operator server 180 and the wholesale operator server 400 or via a manual process. Although not shown in FIG. 8, the billing server 150 may be included in the reconciliation process.

Figure 9:
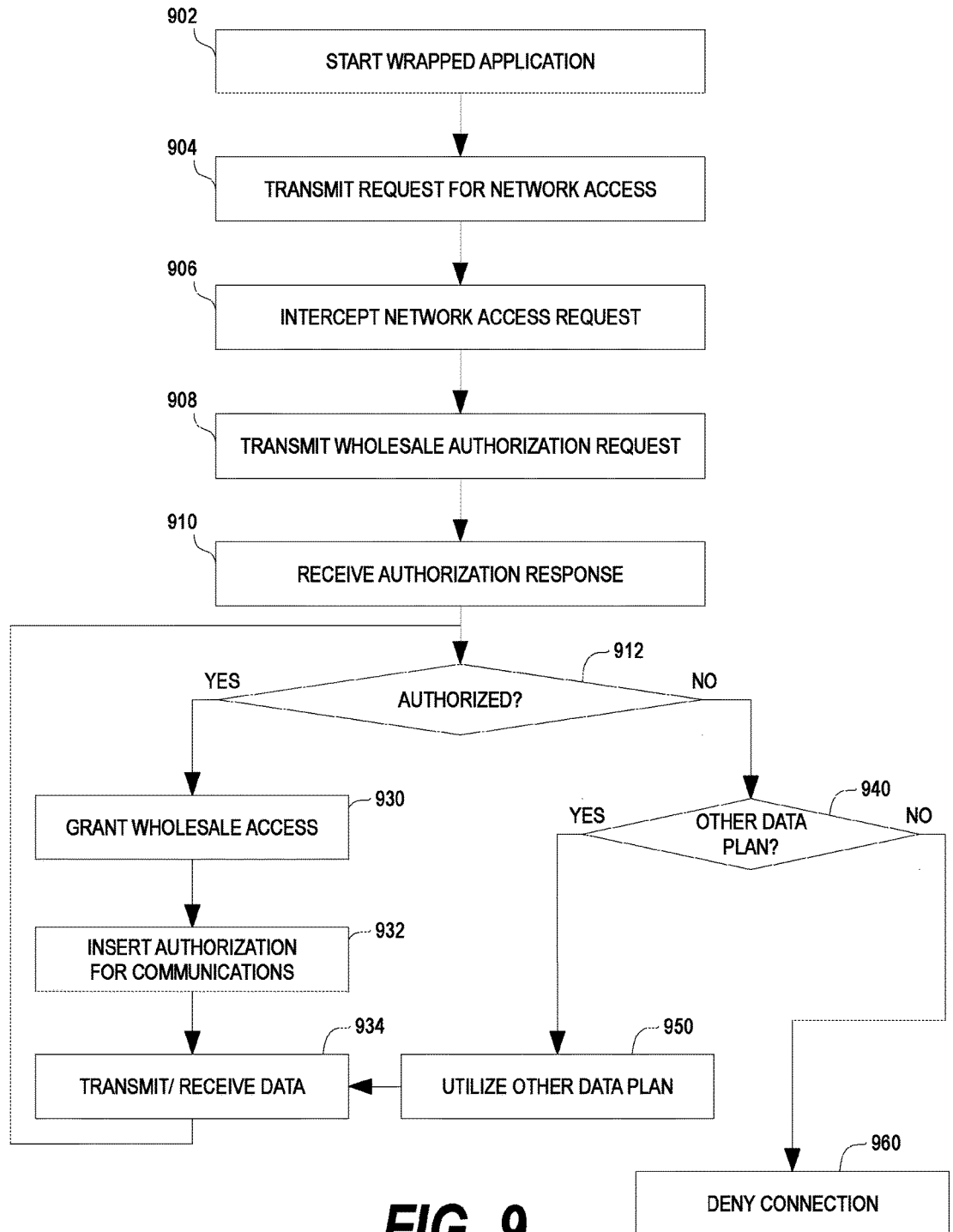
FIG. 9 is a process flow diagram for an example method of data transmission.

FIG. 9 is a process flow diagram for an example method of data transmission. The method shown in FIG. 9 may be implemented via a communication device such as the communication device shown in FIG. 2.

The process begins at block 902 where a wrapped application for the communication device is started. Starting a wrapped application may include, for example, executing the application or attaching a component to the communication device.

At block 904, the wrapped application 220 transmits a request for network access. The request may be seeking data network access. The request may include one or more of the application identifier, a destination address (e.g., IP address, canonical Internet address, SSID, port, protocol, or other destination identifier), and credential information (e.g., security token; digital certificate; etc.). The request may be transmitted via wired and/or wireless means.

At block 906, the network access request is intercepted by the wrapper 300. The wrapper 300 may form a container for communications to and from the application. The container may monitor and control data transmitted by the application and data received for the application. The container may be transparent to the application as well as the device. In some implementations, the container serves as a proxy for communication and other functions between the application and the communication device.

At block 908, the wrapper 300 transmits a wholesale authorization request. The wholesale authorization request may be similar to those discussed above with reference to, for example, FIGS. 5 and 7. The wholesale authorization request may be transmitted via wired and/or wireless means.

At block 910, the wrapper 300 receives an authorization response. The authorization response may be similar to those discussed above with reference to, for example, FIGS. 5 and 7. The authorization response may be received via wired and/or wireless means. The authorization response may be received via different means than used to transmit the wholesale authorization request.

At block 912, a determination is made as to whether the access is authorized. The determination is based on the received authorization response. For example, the authorization response may include a value indicating whether or not the request is authorized. The authorization response may also include an authentication token. The authentication token may be included in subsequent communications to identify the application traffic as an authorized transmission.

If the determination at block 912 is that the access is an authorized wholesale access, the process continues to block 930. At block 930, the wrapper 300 grants wholesale access for the wrapped application 220. Granting wholesale access may include establishing a connection for the application and providing a message indicating such establishment.

At block 932, authorization identification is included in subsequent communications from the wrapped application 220. This may include the authorization token. The authorization identification may be included in a header of the communication. In some implementations, the authorization identification may be included in a data field within the body of the communication (e.g., as part of the application data).

At block 934, the application data including the authorization identification is transmitted and/or received. The transmission of data may also include transmission of the usage information collected by the wrapper 300. The transmission of data can further include transmitting and/or receiving wrapped application configuration information.

Once transmitted, the process returns to block 912 to determine whether the connection remains authorized. The authorization may expire, the authorization limits (e.g., data quantity) may be exceeded, or an event may have occurred causing the authorization to terminate (e.g., powering down, handoff to a Wi-Fi network, handoff to a free network).

If the determination at block 912 is that the wrapped application 220 is not authorized, the process continues to block 940. At block 940, a determination is made as to whether another data access plan is available. As discussed above, the communication device may transition to a wireless network such as a Wi-Fi network in an office. As the device transitions, the need for "free" access may not be necessary as the device may be configured to freely access the Wi-Fi network. If there is another data access plan available, the process continues to block 950 where the alternative plan is utilized for the wrapped application 220. In this situation, the data may be monitored and event information collected. However, the data meter for the wrapped application 220 may be paused as a wholesale connection is no longer needed for the application. Should the device transition back to cellular/LTE access, a reauthorization may occur starting with block 912 as described above.

Returning to block 940 of FIG. 9, should no other data access plan exist for the communication device, the connection request may be denied at block 960. The denial may include transmitting a message to the wrapped application 220 to indicate no data connection is currently available. The wrapped application 220 may be configured to take various actions including returning to block 904 to transmit another request, prompting the user for additional access plan information, prompting a user with the reason for denying the connection (e.g., exceeded amount allocated, moved outside the wholesale geospatial location (e.g., left the store), etc.).

Figure 10:
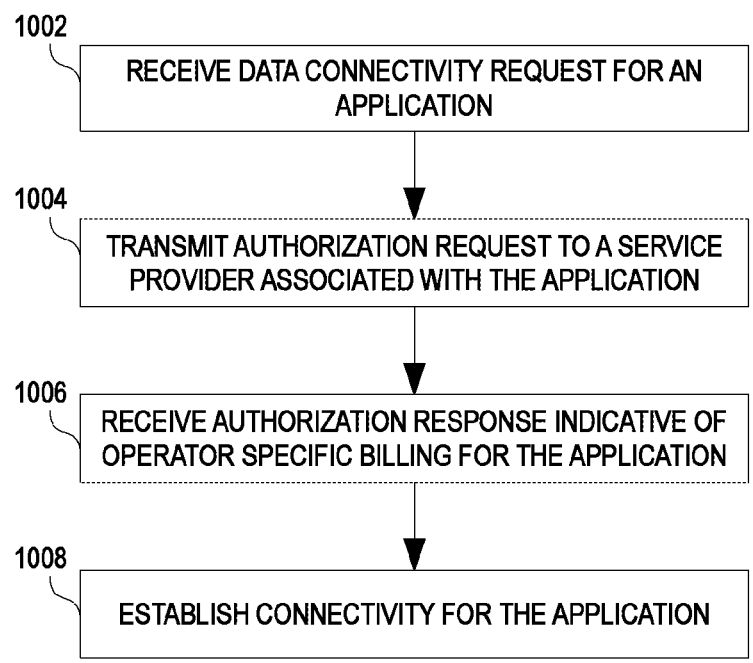
FIG. 10 is a process flow diagram for an example method of establishing data connectivity.

FIG. 10 is a process flow diagram for an example method of establishing data connectivity. The method shown in FIG.

10 may be implemented via a communication device such as the communication device shown in FIG. 2 or the wrapper 300 shown in FIG. 3.

The method begins at block 1002 where a data connectivity request is request is received for an application. The data connectivity request may include an authorization request as described above. The data connectivity request may be received directly from the device requesting connectivity. In some implementations, the request may be received via one or more intermediaries. At block 1004, an authorization request is transmitted to a service provider associated with the application. One example of the service provider is the wholesale operator. At block 1006, an authorization response is received from the service provider. The authorization response is indicative of operator specific billing for the application. At block 1008, the connectivity is established for the application based on the authorization response.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A communication device for providing data connectivity, the communication device comprising:

a connection detector configured to:
  receive a data connectivity request from an application installed on the communication device; and
  retrieve operator specific billing for the application;
an authentication transceiver configured to:
  transmit an authorization request for operator specific billing to a service provider associated with the application via a telecommunication connection, the authorization request including an application identifier for the application, an indication for the operator specific billing, and an operator identifier for the service provider; and
  receive an authorization response indicative of operator specific billing for the application from the service provider; and
a connection manager configured to establish data connectivity via the telecommunication connection based on the authorization response.

2. The communication device of claim 1, wherein the data connectivity request includes a packet data network destination address.

3. The communication device of claim 1, wherein the authorization request further includes one or more of a location identifier indicating a geospatial location of the communication device, a device identifier uniquely identifying the communication device, and a user identifier indicative of a user of the application causing the data connectivity request.

4. The communication device of claim 1, wherein the telecommunication network is operated by the service provider.

5. The communication device of claim 1, wherein the telecommunication network is operated by a partner service provider.

6. The communication device of claim 1, wherein the authorization response includes at least one of an authorization token and data connectivity policy information.

7. The communication device of claim 6, wherein the connection manager is configured to include the authorization token in data transmitted via the telecommunication connection.

8. The communication device of claim 6, wherein the data connectivity policy information includes at least one of a data transmission amount, a received data amount, a data connection duration, and a policy expiration time.

9. The communication device of claim 1, wherein the connection manager is configured to establish a toll-free data connection.

10. The communication device of claim 1, further comprising a connection monitor configured to collect information for an authorized data connection.

11. The communication device of claim 10, wherein the information collected for the authorized data connection includes a data transmission amount, a received data amount, a data connection duration, a destination of data transmitted, a source of data received, one or more data request messages, one or more data response messages, and a time at which the authorized data connection was established.

12. The communication device of claim 11, wherein the connection manager is further configured to:
  obtain information collected for the authorized data connection; and
  maintain the authorized data connection based on a comparison of the information collected and the authorization response message.

13. The communication device of claim 12, wherein maintaining the authorized data connection comprises terminating the authorized data connection when the collected information indicates the authorized data connection has exceeded an authorized limit included in the authorization response message.

14. The communication device of claim 11, further comprising a report transmitter configured to transmit at least a portion of the collected information to the service provider.

15. The communication device of claim 14, wherein the report transmitter is configured to transmit based on at least one of power or network bandwidth available to the communication device.

16. The communication device of claim 15, wherein the report transmitter is configured to store the portion of the collected information when the at least one of power or network bandwidth available is below a threshold value.

17. The communication device of claim 11, further comprising a status transmitter configured to transmit a status message for the authorized data connection to at least one of the application or the communication device, the transmitting based on a comparison of the information collected and the authorization response message.

18. The communication device of claim 17, wherein the status message includes an amount of data connectivity remaining for the application.

19. A method of providing data connectivity, the method comprising the following acts performed by a communication device:
  receiving a data connectivity request from an application installed on the communication device;
  retrieving operator specific billing for the application;
  transmitting an authorization request for operator specific billing to a service provider associated with the application via a telecommunication connection, the authorization request including an application identifier for the application, an indication of the operator specific billing and an operator identifier for the service provider;
  receiving an authorization response indicative of operator specific billing for the application from the service provider; and
  establishing data connectivity via the telecommunication connection based on the authorization response.

20. The method of claim 19, wherein the data connectivity request includes a packet data network destination address.

21. The method of claim 19, wherein the authorization request further includes one or more of a location identifier indicating a geospatial location of the communication device, a device identifier uniquely identifying the communication device, and a user identifier indicative of a user of the application causing the data connectivity request.

22. The method of claim 19, wherein the authorization response includes at least one of an authorization token and data connectivity policy information.

23. The method of claim 22, further comprising including the authorization token in data transmitted to or from the application via the telecommunication connection.

24. The method of claim 19, further comprising collecting information for an authorized data connection.

25. The method of claim 24, wherein the information collected for the authorized data connection includes a data transmission amount, a received data amount, a data connection duration, a destination of data transmitted, a source of data received, one or more data request messages, one or more data response messages, and a time at which the authorized data connection was established.

26. A non-transitory computer-readable storage medium comprising instructions executable by a processor of a communication device, the instructions causing the communication device to:
- receive a data connectivity request from an application installed on the communication device;
- retrieving operator specific billing for the application;
- transmit an authorization request for operator specific billing to a service provider associated with the application via a telecommunication connection, the authorization request including an application identifier for the application, an indication of the operator specific billing and an operator identifier for the service provider;
- receive an authorization response indicative of operator specific billing for the application from the service provider; and
- establish data connectivity via the telecommunication connection based on the authorization response.

* * * * *